Dec. 6, 1932.  W. E. SCHWARZMAN  1,890,305
MAGNETO
Filed March 22, 1930  5 Sheets-Sheet 1
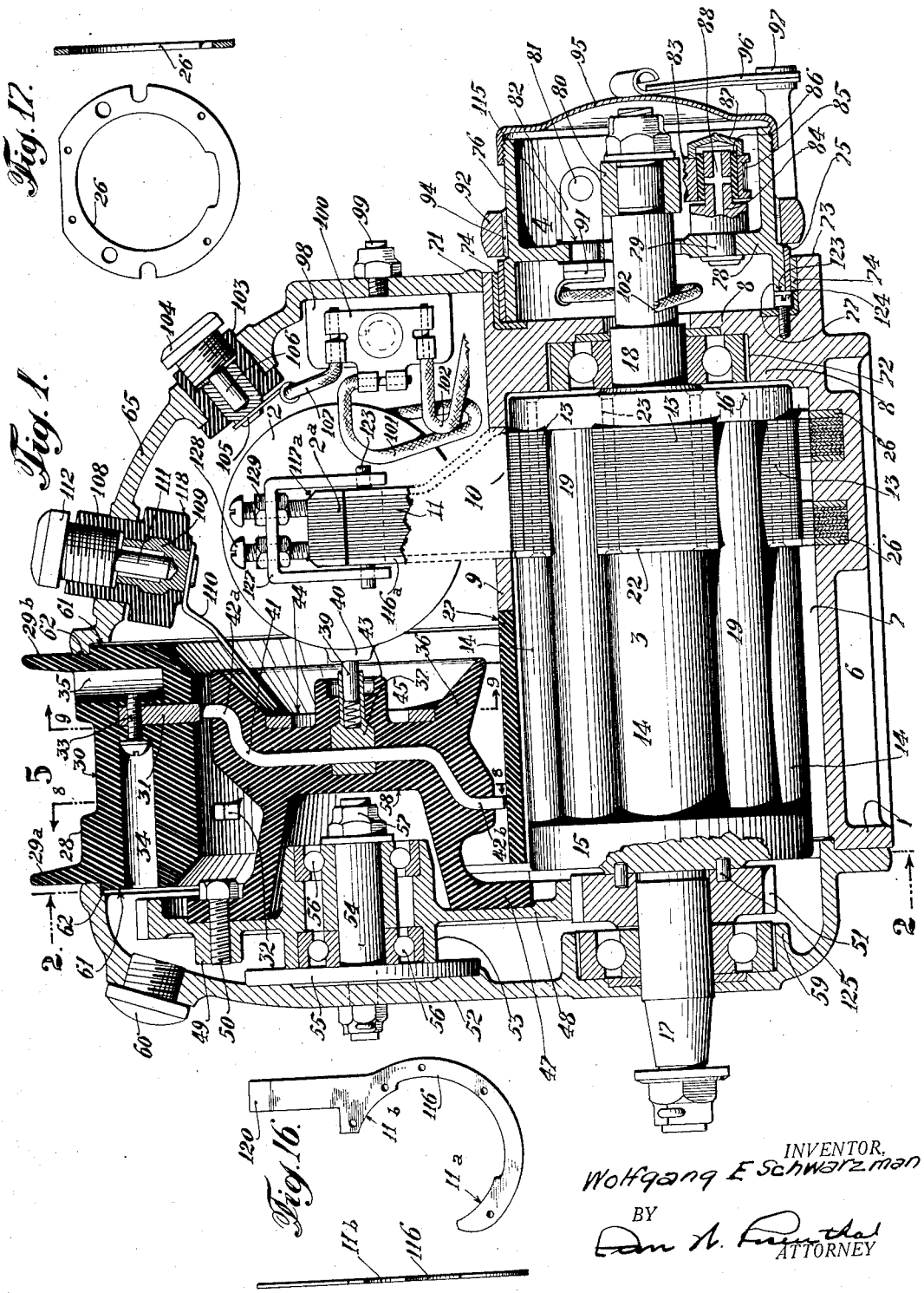
INVENTOR,
Wolfgang E Schwarzman
BY
ATTORNEY

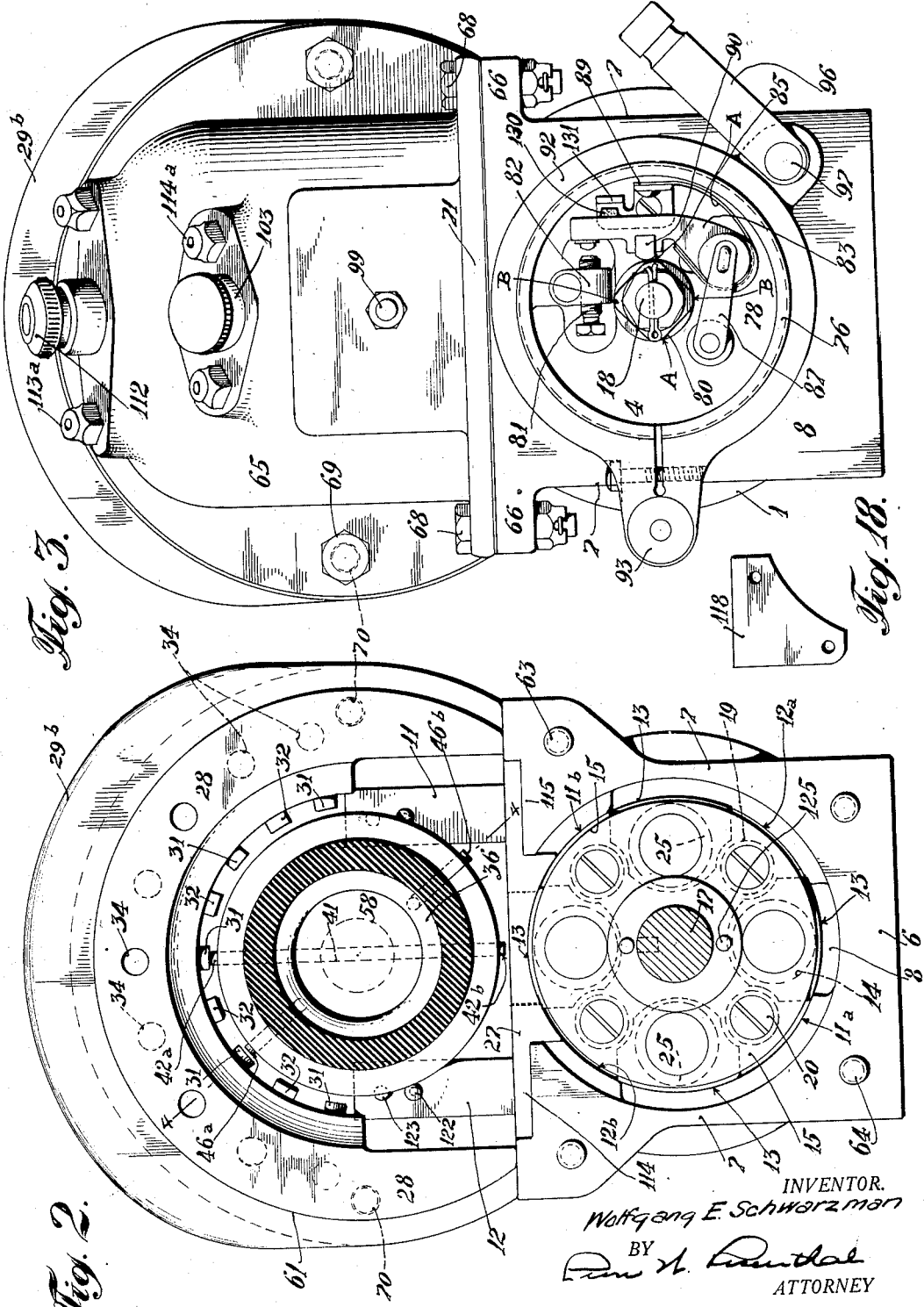

Dec. 6, 1932. W. E. SCHWARZMAN 1,890,305
MAGNETO
Filed March 22, 1930 5 Sheets-Sheet 3

INVENTOR.
Wolfgang E. Schwarzman,
BY
ATTORNEY.

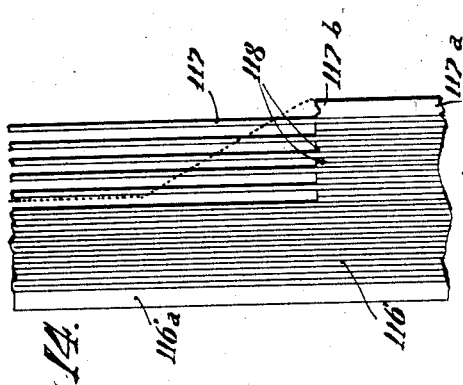
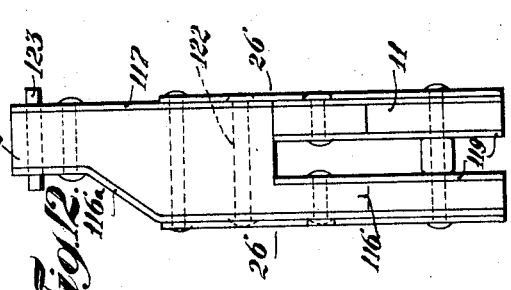
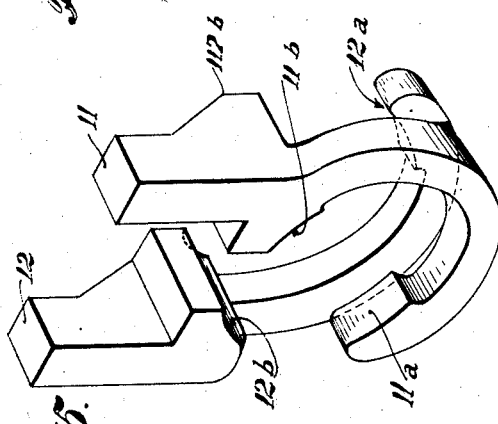
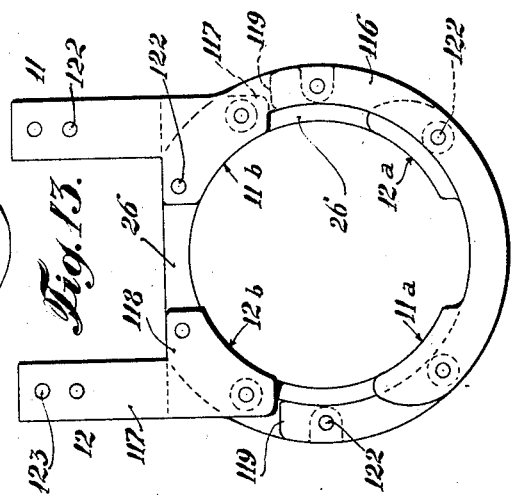
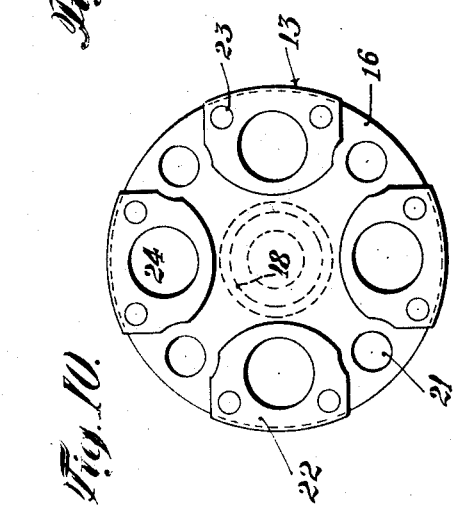
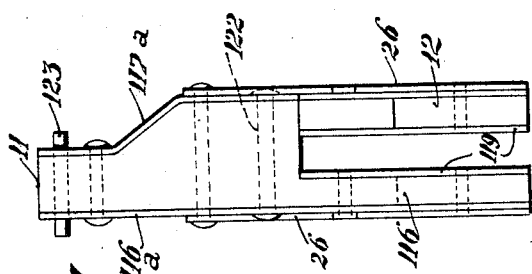

Dec. 6, 1932.  W. E. SCHWARZMAN  1,890,305
MAGNETO
Filed March 22, 1930   5 Sheets-Sheet 5
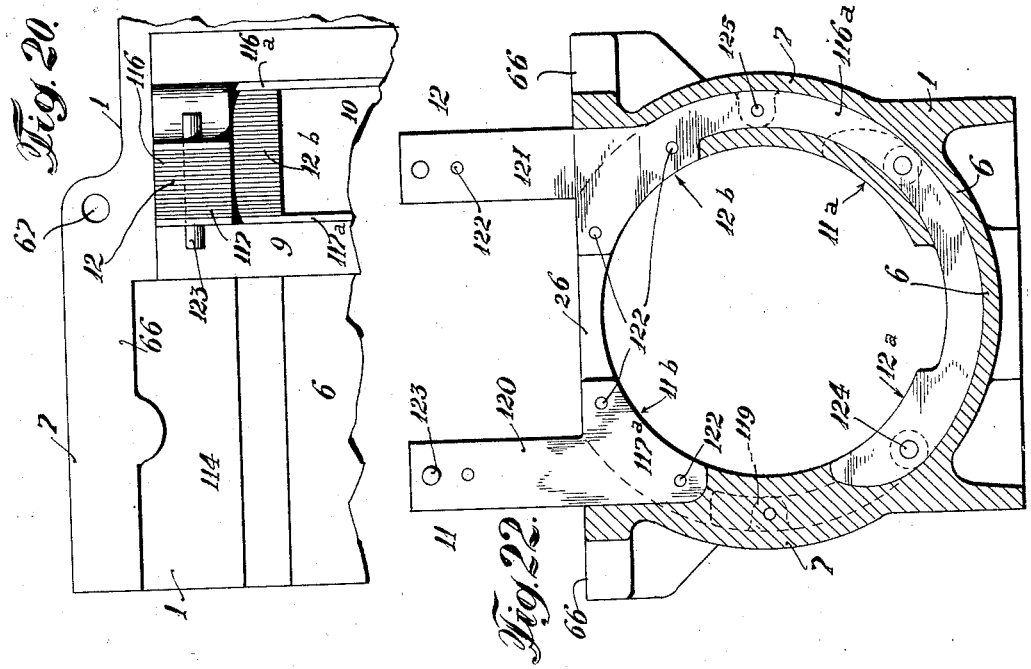
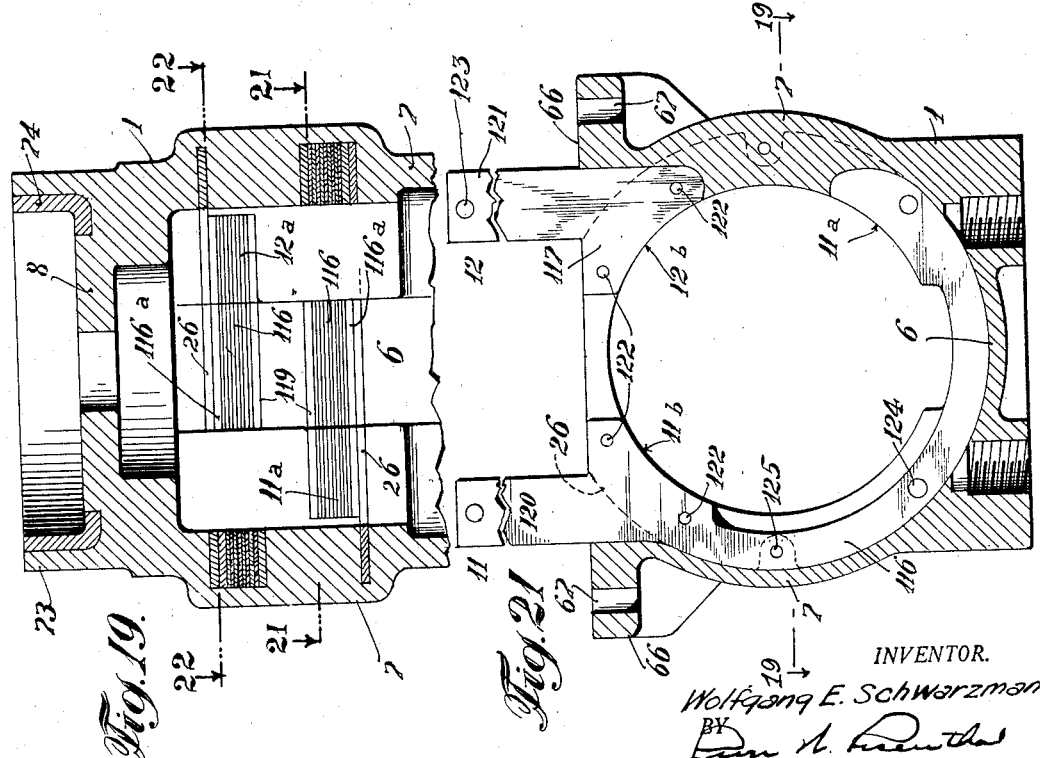
INVENTOR.
Wolfgang E. Schwarzman
BY
ATTORNEY.

Patented Dec. 6, 1932

1,890,305

UNITED STATES PATENT OFFICE

WOLFGANG E. SCHWARZMAN, OF LONGMEADOW, MASSACHUSETTS, ASSIGNOR TO AMERICAN BOSCH MAGNETO CORPORATION, OF SPRINGFIELD, MASSACHUSETTS, A CORPORATION OF NEW YORK

MAGNETO

Application filed March 22, 1930. Serial No. 438,040.

The invention herein embraces an improved magneto; and especially a magneto to be used in connection with internal combustion engines to supply electric current for purposes of ignition.

One object of this invention is to provide a novel ignition magneto of comparatively small size, light weight and low cost, but of high efficiency and large output.

Another object of the invention is to provide a magneto which will afford a relatively large number of ignition sparks per revolution, and which can be connected so that it will be driven by the engine to the best advantage.

A further object is to provide an ignition magneto equipped with high tension windings, and having the smallest possible number of moving parts for conducting current to the sparkplugs of the engine.

An additional object of this invention is to provide a magneto adapted to operate upon the inductor principle, with rotating polepieces and magnets, a plurality of sets of stationary polepieces of particular construction and arrangement; and a fixed generating coil cooperating therewith to give the desired result and always produce ignition at the correct instant.

The other objects and advantages of the invention will be set forth in the following description and drawings which illustrate the best form of the invention now known to me. However, this specification is intended to be for explanation only and I reserve the right to make any changes that are consistent with the spirit of the invention and do not exceed its scope.

Figure 4:
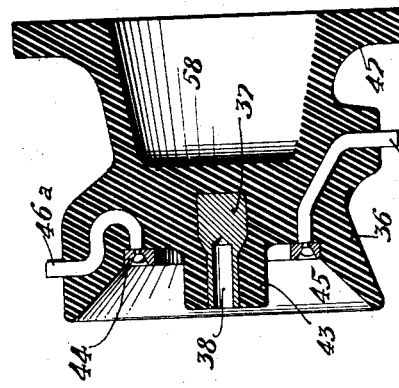
Figure 5:
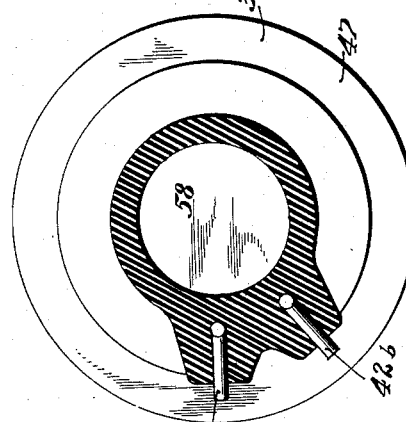
Figure 6:
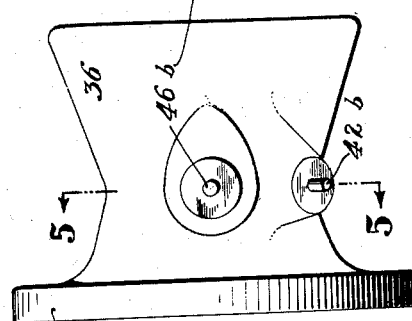
Figure 7:
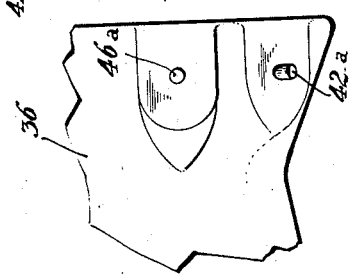
Figure 9:
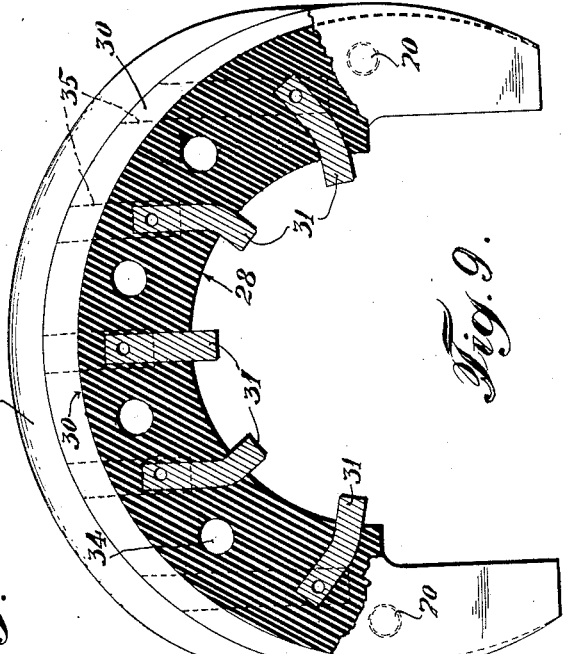
Figure 8:
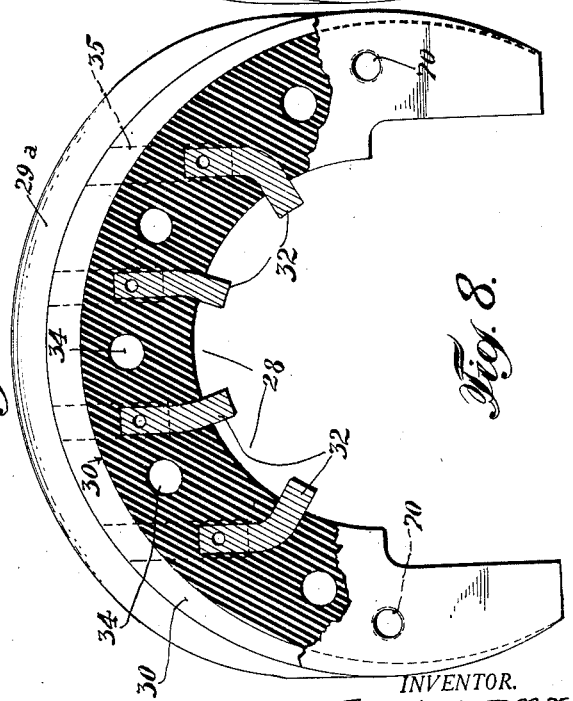

On the drawings,

Fig. 1 is a longitudinal, vertical section through a magneto according to the invention; Fig. 2 is a transverse vertical section thereof on line 2—2 of Fig. 1, looking in the direction of the arrows; Fig. 3 is a rear view of same, showing the circuit breaker or interrupter; Fig. 4 is a longitudinal section through the rotary member of the distributor of the magneto, taken on line 4—4 of Fig. 2; Fig. 5 is a cross section of said member on the line 5—5 of Fig. 6; Fig. 6 is an elevation of same, seen from above in Fig. 3, showing the ends of the high tension distributing brushes; Fig. 7 is a view of the opposite side of said member, showing the opposite ends of said brushes; Figs. 8 and 9 are sections through the stator member of the distributor, taken on lines 8—8 and 9—9 of Fig. 1, looking in the direction of the arrows; Fig. 10 is a front view of the assembled polepieces of the rotor of the magneto seen from the left in Fig. 1; Figs. 11 and 12 are views from opposite sides of the stator polepieces of the magneto, and Fig. 13 is a side view thereof, seen from the left of Fig. 11; Figs. 14, 16, 17 and 18 show laminated elements and associated retaining means used in assembling the polepieces of the stator; Fig. 15 is a perspective view of said stator polepieces, the laminated effect being omitted for the sake of clearness; Fig. 19 is a horizontal section showing a portion of the housing of the magneto, with stator polepieces in place, taken on line 19—19 of Fig. 21; Fig. 20 is a top plan of said housing, showing one duplicate half thereof; and Figs. 21 and 22 are vertical cross sections on lines 21—21 and 22—22 respectively of Fig. 19, looking in the direction of the arrows.

The same numerals identify the same parts throughout the several views.

All parts of the magneto are supported in position by the body or framework 1 of nonmagnetic metal, preferably cast in one piece. The inductive windings 2 are above the body or housing 1, and in the housing is the rotor 3, having magnets to energize windings 2. These windings will include both a secondary coil and a primary coil, with the circuit of the latter to be closed and opened by the interrupter shown at 4 in Fig. 1; and the energy of the secondary is supplied to the igniters or sparkplugs of the engine through the terminals of a distributor 5 in front of the windings 2, and mounted above one end of the housing 1.

As shown in Figs. 1 and 20, the top 9 has a transverse aperture 10 for the stator pole pieces 11 and 12, which are embedded in the sides 7 of the housing and project through the top to engage the opposite ends of the magnetic core 2a of the stator windings 2. The pole pieces 11 and 12 and core 2a are of course laminated as shown and so are the polepieces 13 of the rotor 3. The laminations of the polepieces 13 are each perforated to receive the extremities of permanent magnets 14, which are preferably four in number, one for each pole piece 13, the latter being in position to cooperate with the stator polepieces. The opposite ends of these magnets, which are of alternate polarity, are received in apertures of a disc or head 15 of magnetic material, and this disc is located at the open end of the housing 1. Adjacent to the opposite end is a disc 16 of non-magnetic material and discs 15 and 16 are rigid with journals or trunnions 17 and 18 respectively upon which the rotor 3 can be revolved. The two discs 15 and 16 are united by tie rods 19 of non-magnetic material; and these rods may either have short screws 20 passing through counter-bored holes in discs 15 and 16 into threaded holes in the ends of the rods, or the ends of the rods may be reduced and riveted in the holes of discs or plates 15 and 16 so as to bind the discs together, and hold the magnets 14 and polepieces 13 securely in place.

At 21 in Fig. 10 are shown the openings in the disc 16 for the rods 19, and similar openings are in the disc or head 15. The rods 19 are between the polepieces 13, and the latter, on the side away from the disc 16, have plates 22 which, with the laminations of the polepieces, are held to the disc 16 by screws 23, and the ends of the magnets 14, which have the form of permanently magnetized cylindrical steel bars, are reduced to form annular shoulders against which the plates 22 are clamped by the rods 19. The plates 22 and the laminations of the polepieces 13 have openings 24 (Fig. 10) of the same size as the reduced ends of the magnets. The shoulders at the reduced ends of the magnets 14 engaging the plate 15 are shown at 25 on Fig. 2, and similar reduced pole ends of the magnets 14 pass through the laminations of polepieces 13 and plates 22. The polepieces 13 are therefore between the disc 16 and plates 22 and the reduced ends of the magnets 14 in the polepieces 13 may either pass through openings in the disc 16, or the disc 16 may be without such openings with said ends simply abutting said disc.

All the laminations of the polepieces 11 and 12 lie between rings 26 cast into the housing 1, and the tops of the polepieces 11 and 12 form a support for the ends of the core 2a of the core 2. The angular extent of the pole-faces of the polepieces 13 and polepieces 11 and 12 is such that when the rotor 3 revolves the magnetic flux of the magnets 14, as will be more clearly seen later, is reversed four times for each revolution, through the core 2a. Thus for each revolution of the rotor four impulses of maximum current are developed.

The timer or interrupter 4 is at one end of the magneto and the windings 2 are adjacent to the same end. The distributor 5 is located adjacent to the opposite end of the magneto over the part of the housing which is open at the top and this open portion of the top of the housing 1 may be bridged by a cover plate 27 of insulating material, having the shape indicated in Fig. 2 with its ends engaging shouldered seats at the upper parts and along the inner edges of the sides 7.

The distributor comprises a fixed curved member of insulation 28, with upward projecting flanges 29a and 29b at its front and rear faces and between these flanges is a groove 30. From the inner or concave face of the member 28 project contact pieces 31, all lying in the same transverse plane adjacent the inner or rear face, and a complementary number of contact pieces 32 in a different transverse plane adjacent the front or outer face. These pieces 31 and 32 are held fast by means of screws 33 which can be put in place and removed through bores 34, the bores 34 for the contact pieces 31 opening through the front face of the member 28 and the bores 34 for the members 32 opening through the other or rear face of this member.

Adjacent to each of the contact pieces 31 and 32 is a bore 35 which opens through the convex exterior of the member 28 to receive the ends of conductors leading to the spark-plugs of the engine. The screws 33 may engage the ends of these conductors and serve as binding means therefor. The ends of the member 28 rest upon the tops of the sides 7.

The distributor also includes a rotary member or head of insulation 36 within which is embedded a metallic inset or plug 37 having a socket 38 to receive the brush or terminal 39 engaging one extremity 40 of the secondary coil of the windings 2. A spring in the socket 38 ensures electrical connection between the terminal 39 and terminal 40.

Embedded in the head 36 and connected with the inset 37 is a metallic rod 41 whose ends 42a and 42b serve as distributor brushes, the end of the brush 42a projecting through the outside surface of the rotor 36 in the plane of contacts 31, and the end of the brush 42b projecting through the head 36 at a diametrically opposite point in the place of the pieces 32. The inset or plug 37 is in line with a central boss 43 on the head 36 and surrounding this boss is a contact ring 44 at the bottom of a groove 45 in the end of the rotor 36. Attached to this ring 44 and embedded in the rotor 36 are two other rotating brushes 46a and 46b diametrically opposite each other and projecting through the outside of the head 36 in the transverse planes of the contact pieces 31 and 32 respectively. As shown in Fig. 2 the contact pieces 31 and 32 are nine in number, so that the magneto is designed to serve for ignition in connection with a 9-cylinder engine. There are five contacts 31 arranged 40° apart and the contacts 32 are likewise 40° apart but are located midway of the adjacent contacts 31. Also the brushes 46a and 46b are 40° apart and the brushes 42a and 42b are the same distance removed from each other.

The rotor 36 has a projecting flange 47 at its outer end which is secured to gear wheel 48 having portions 49 to receive fastening devices or the like 50. This gear wheel meshes with a smaller gear wheel 51 rigid with the trunnion 17 and disc 15 and at 52 is a cover plate which closes the open end of the housing 1 and shields the distributor 5. The gear 48 has a hub 53 and is mounted upon a journal 54 made integral with a plate or flange 55 secured to the inside of the cover plate 52. Between the hub 53 and the journal 54 are ball bearings 56 and the inner end of the journal 54 bears a locking device or nut 57 which holds the race-way members of the ball bearings in place. To make the construction compact, the adjacent end of the rotary member 56 is hollowed out to provide a large recess 58 into which the hub 53 and some of the adjacent parts may project. The inside of cover plate 52 may be provided with a circular rib 59 which receives a similar ball bearing 56 for the trunnion or shaft 17 and the aperture in the closed end 8 of the housing 1 may be counterbored for a ball bearing 56 surrounding the trunnion or shaft 18. At the top of the cover plate 52 is an opening which may be closed by removable screw plug 60. Projecting from the front face of the member 28 is a curved rib 61 and the adjacent edge of the concave cover plate 52 is provided with an annular rim 62 which fits the rib 61.

The cover plate 52 may be secured by means of nuts engaging threaded bolts 63 and 64 projecting from the opposite sides of the base 6 at the ends of the sides 7, the cover having openings through which these shanks extend, and the outer ends of these bolts may receive lock nuts.

On the rear face of the stator member 28 also is a curved rib or projection 61 to engage a rim on a concave cover 65 for the opposite end of the magneto above the housing 1.

Both sides 7 have out-turned horizontal projections 66 having openings 67 and the cover 65 will have at its opposite lower edges similar projections with openings through which can be passed locking bolts 68 to project through the openings 67 and receive nuts to make the cover 65 fast. At opposite sides the cover 65 will be held by bolts 69 to enter threaded openings 70 in the stationary member 28. Member 28 is thus firmly affixed between the two cover plates 52 and 65 and cannot be removed unless one or the other of these cover plates is taken off.

For the ball bearing in the closed end 8 of the housing 1 the recess is shown at 72. Beyond this end of the housing is a tubular extension 73 having lining rings 74 and 75. The casing for the timer is shown at 76. It has a tubular projection 77 to fit into the extension 73, this projection being secured to the outer face of the bottom of this casing. The bottom 78 of the casing 76 is apertured to admit the trunnion 18, which is reduced and shouldered within the casing 76 to carry thereon a cam 80. At 81 is a fixed contact adjustably secured to a support 82 mounted in the bottom of the casing 76 and insulated therefrom. This contact cooperates with the breaker lever 83. The pivot or journal 84 for this lever is secured at 79 to the bottom 78 of the casing 76 and a spring 85 is attached to this lever and bent around the end thereof as shown in Fig. 3 to force the lever normally into engagement with the contact 81. The journal 84 carries a sleeve or bushing 86 and at 87 is a spring pivotally secured at one end to the bottom of the casing 76 and pressing at its other end upon the journal 84 so that the breaker lever cannot move off this pivot. Within the journal are lubricating passage ducts 88. The bottom of the casing 76 also carries a projection 89 to which the other end of the spring is secured and the lever 83 may have a fibre insert 90 to be engaged by the cam 80. The lever can be taken off any time simply by swinging the spring 87 to one side. The inner end of the support 82 passes through the bottom 78 and terminates in a binding post 91 for connection with one terminal of the primary coil of the windings 2.

Around the casing 76 is a timer ring 92 having an operating arm 93, and this ring may have toothed engagement with the outside of the casing 76 so that it may be adjustably connected therewith as shown at 94. At 95 is a cover for the casing 76 and at 96 is a clamp for this cover pivoted to a post 97, so that it can be swung into and out of clamping position. The ring 92 may be split near the arm 93 as shown in Fig. 3, with a screw at the split to cause the arm to grip the casing 76.

Inside the cover 65 is a recess or pocket on its interior to receive a condenser 98. This condenser may be disposed within a suitable container having a stem 99 projecting through to the outside of the cover 65 and threaded to receive a binding nut to hold the condenser in place. On the condenser is a contact plate 100 and one terminal of the primary winding may be attached to this plate 100 by conductor 101, the plate 100 also being joined by the wire 102 to the binding post 91, the wire passing through an opening drilled in the housing 1. One terminal of the condenser may also be attached to the contact plate 100 and the other may be grounded through a suitable grounding terminal comprising an insulating bushing 103 and a binding post 104 mounted in the plate 65. The insulating sleeve 103 has a metallic core 105 which is hollowed to receive the stem 106 of the screw post 104 and the plate 100 may be attached to this core by conductor lead 107. The other terminal of the primary is grounded in the usual way. The circuit of the primary is completed through the breaker lever 83 and is broken whenever the cam 80 actuates the lever 83. The plug 104 of the grounding terminal may be connected to ground in any suitable manner.

When the trunnion 17 is connected to a suitable driving shaft and the rotor revolved, the lever 83 will be actuated twice per revolution by the noses marked A on the cam 80. Whenever the lever 83 is actuated the primary winding on the coil 2 is energized, and the primary winding causes the secondary to generate a high voltage which is delivered to the brushes 42a and 42b. Suppose at this time the brush 42a is in line with the contact piece 31 at the middle of Fig. 2. In this position high tension current will be delivered to the engine whose sparkplug is connected with that contact piece. After another quarter revolution of the rotor 3 the timer lever will again be actuated and the same brush 42a will deliver high tension current to the next contact piece 31. After passing the last contact piece 31 the brush 42a will be replaced in action by the brush 42b which will deliver current to the contact pieces 32 in succession. The other brush 42a will then come into action again and the cycle will be repeated. The diameter of the gear 48 is 2¼ times that of the gear 51 to give this mode of operation.

In the cover 65 also is a booster terminal consisting of an insulating sleeve 108 in a suitable opening in the plate 65. This sleeve has a metallic plug or core 109 at its inner end and to this plug 109 is affixed a stationary brush 110 which cooperates with the contact ring 44. The core 109 is hollow to receive a projection 111 on a screw plug 112 which screws into the open outer end of the sleeve 108. This booster terminal permits current from an outside source to be used to actuate the distributor 5 and this external high tension current is supplied to the contact pieces at 31 and 32 by the brushes 46a and 46b in the same manner as the brushes 42a and 42b. Each of the brushes 46a and 46b is 40° from the nearest brush 42a and 42b. With the rotation of the member 36 taken as clockwise in Fig. 2, the brushes 46a and 46b are arranged to follow the brushes 42a and 42b, so that when the booster is used the ignition is retarded. At this time the noses B on the cam operate the breaker lever in synchronism with the action of the brushes 46a and 46b. The booster terminal can be used for starting, or in the event of a mishap which puts the rotor 3 or windings 2 of the magneto out of service.

So constructed the magneto can easily be assembled or taken apart and access to the distributor can be had by removing the front and back plates 52 and 65, or either of these. Inspection of the timer is afforded simply by taking off the cap 95 and the whole timer casing 76 and other parts can be dismounted by withdrawing the projection 77 from the extension 73 of the frame 1.

The rings 25 have the opening at the middle substantially circular to correspond with the path of the rotation of the outer curved faces of the pole pieces 13. One face of the plate 27 is also concave on the same curvature and the sides 114 of this plate project as shown to rest upon the shouldered seats 115 along inner edges of the sides 7 at their tops. This plate may be secured in any suitable manner.

To utilize the source connected with the booster terminal, and the distributor brushes 46a and 46b for starting the engine or under other conditions, the ring 92 and casing 76 are set to give ignition at the point required, to compensate for the fact that the cam noses B follow the noses A, and the brushes 46a and 46b follow the brushes 42a and 42b. When properly manipulated, the arm 93 gives the necessary adjustment of the timer casing 76 and fixed contact 81 at all times for both the booster and the outside source of current, and the magneto.

As shown best on Figs. 13 and 15, the pole pieces 11 and 12 each have two polar faces or projections 11a and 11b and 12a and 12b. The faces of each polepiece are 180° apart in the rotation of the rotor 3, but the polar projections of the two polepieces alternate in position. Thus on Fig. 15 the order is 11b, 12a, 11a and 12b, if the direction of rotation is taken as clockwise when the polepieces are observed from in front of Fig. 15. The polar faces 11b and 12b adjacent the top of the housing are broader, measured axially of the rotor, than the polefaces 11a and 12a, but all four of the polar faces have substantially the same extent when measured in angular degrees of rotation of the magnets 14. Further, the polar faces 11b and 12b, that is their centers, are in the same transverse plane, but the polar faces 11a and 12a are in different transverse planes, because the limbs of each polepiece 11 and 12 carrying the polar projections 11a and 12a overlap each other. Each pole piece is thus substantially hook-shaped, with its thickest part at the top in contact with one end of the core 2a.

The operation is such that the N-poles of the magnets 14 will come opposite the polar faces 11a and 11b, while the S-poles will do likewise with the polar faces 12a and 12b. Then the N-poles will come opposite the faces 12a and 12b and the S-poles will do likewise with the other two polar faces. The direction of the magnetic field through the core 2a is therefore reversed, and this happens four times for each revolution of the rotor 3.

Each polepiece is laminated and contains three different sets of laminæ of different lengths. One set 116 is as long as the polepieces. In the polepiece 11 the laminæ 116 are quite flat or planar and are in sufficient numbers to make the polar face 11a and part of the polar face 11b. To give the remainder of the wider polar faces 11b, other and shorter laminæ 117 and 118 are employed. The laminæ 117 have the same shape as the upper ends of the laminæ 116 down to and including the polar projections 11b, and the laminæ 118 have approximately the shape of the laminæ 116 adjacent the polar projections 11b only, that is they are more or less triangular as shown in Fig. 18. The faces of the laminæ 117 are laid against the laminæ 116 at their tops and bent outward and downward. At the points 117b they are again bent into parallelism with the laminæ 116, but with spaces in between for the laminæ 118. The laminæ can all be assembled as in Fig. 14, and then the tops of the laminæ 117 can be bent to make them solid with the upper ends of the laminæ 116 as indicated by the broken line at the right of Fig. 14. The laminæ 116 and 117 are then secured at their upper ends by rivets and additional rivets can be added to hold the laminæ 118 and the lower curved ends of the laminæ 116. To make up the other polepiece 12, similar laminæ are employed but the shorter laminæ 117 again have their lower ends separated by the required number of laminæ 118 to form with the laminæ 116 the face 12b, and the upper ends of the laminæ 116 are bent laterally at their tops to be solid with the laminæ 117. This difference in construction is due to the fact that the polar face 12b must be offset in the opposite direction from the polar face 11b, and is nearer to the open end of the housing.

The outermost laminæ 116a are relatively thick and so are the outermost laminæ 117a. Below the polar projections 11b and 12b, the laminæ 116 are faced with thicker laminæ 119 of the same shape as the laminæ 116 below the projections which make up the polar faces 11b and 12b. The rings 26 receive the pole pieces 11 and 12 between them and are cast therewith into place in the housing 1. Any suitable number and arrangement of rivets 122 can be employed to unite the laminations; but the rivets which extend through parts of both polepieces 11 and 12 should of course be non-magnetic.

It will be observed that with the pole pieces 11 and 12 constructed as above described one of these pole pieces 11 in effect lies entirely within a single plane that is normal to the axis of revolution of the magnets; except, of course, for the part of the polar face 11b which is extended in the direction of the axis of the housing toward the closed end 8 of the rotor chamber. In other words, the body of the pole piece 11 is not bent laterally; while, on the other hand, the pole piece 12, because of the fact that the long laminæ 116 are not flat or planar, is in effect bent or off-set laterally and therefore this pole piece does not lie in a single plane normal to the rotor axis because the upper part thereof is to one side of the lower part to be in alinement with the core 2a.

Therefore, when the stator is assembled it can be mounted in the housing relatively close to the distributor, because the pole piece 11 is wholly flat on the side or face adjacent to the distributor; likewise the upper part of the adjacent face of the other pole piece (12) is flush with the aforesaid face of the pole piece 11. The opposite side of the pole piece 12, on account of its off-set construction, is farther away from the distributor. By thus disposing the stator in relatively close proximity to the distributor sufficient room is provided for the condenser 98 on the other side of the coil without requiring a larger cover 65 and without necessitating that the housing be of any greater length along the axis of the rotor. Hence there is a saving in both weight and space.

Further the upper parts of the pole pieces 11 and 12 are of equal thickness with the core 2a; while the lower parts are about one half this thickness. The pole faces 11b and 12b are made wider because the upper parts of the two pole pieces must carry twice as much magnetic flux as the polar faces 11a and 12a and the laminæ 117 and 118 afford a magnetic path through which this additional flux is directed.

At the tops 120 and 121 of the polepieces 11 and 12 are projection pins or studs 123. These studs attach to the polepieces yokes or clamps 127. The ends of the core 2a are rabbeted to rest on the tops of polepieces 11 and 12 and the clamps 127 hold the core in contact with the polepieces. For this purpose each yoke carries compression screws 128 with lock nuts 129 to enable the ends of the core 2a to be forced down tight against the polepieces 11 and 12.

The insulation for the support 82 where it is mounted in the bottom 78 of the casing 76 is shown in Fig. 1 at 115.

The ground terminal and the booster terminal may be secured by bolts 114a and nuts 113a. The bushings of insulation may have flanges 118, which will be so shaped as to be elongated, so as to provide oppositely disposed perforated ends to receive the bolts 114a.

The breaker lever 83 may have a small cushion 129 attached to the side away from the cam 80, to engage a projection 131 on the part 84 secured to the bottom 78 of the casing 76, and having the spring 83 affixed thereto; so that the cushion 129 may strike the projection 131 as the lever 83 is actuated by the cam, to thereby hasten the closing of the lever at high speed.

At 123 is a recess in the projection 74 on the casing 76 of the timer or interrupter and in the end 8 is a screw 124, within the extension 73 to be received in this recess, so that the casing 76 cannot rotate in the extension 73.

Gear 51 on the shaft 17 may be made rigid with the disc 15 by studs 125 entering apertures in the disc so that the gear 15 will revolve with the shaft 17 and rotor 3.

Having thus described my invention, what I claim is:

1. A magneto having a polepiece comprising laminæ of unequal sizes, said laminæ being shaped and arranged to render the pole piece thicker at one end than the other and to provide polar faces adjacent the ends of the pole pieces with the polar faces adjacent the thicker end of greater width than the other polar projection.

2. A magneto having a polepiece comprising laminæ of great length, laminæ of less length, and relatively short laminæ interspersed among the laminæ of less length, said laminæ being shaped and arranged to render the pole piece thicker at one end than the other and to provide polar faces adjacent the ends of the pole pieces with the polar faces adjacent the thicker end of greater width than the other polar projection.

3. A magneto having a polepiece comprising laminæ of great length, shorter laminæ attached thereto at one end, with their opposite ends separated, and relatively small laminæ among the opposite ends of said shorter laminæ, said laminæ being shaped and arranged to render the pole piece thicker at one end than the other and to provide polar faces adjacent the ends of the pole pieces with the polar faces adjacent the thicker end of greater width than the other polar projection.

4. A magneto comprising stator polepieces with overlapping portions, which have polar faces at their ends, and additional polar faces on said polepieces, the polar faces on each polepiece being of unequal area, and means comprising magnetic poles of like polarity for passing magnetic flux through both polar faces of each polepiece simultaneously.

5. The magneto according to claim 4 wherein the polar faces on the overlapping portions are spaced apart, the additional polepieces being in opposed positions.

6. A magneto comprising polepieces with wide and narrow polar faces, the wide polar faces being laterally extended in opposite directions, and means comprising magnetic poles of like polarity for supplying magnetic flux to each polepiece through the wide and narrow polar faces thereon simultaneously.

7. The magneto according to claim 6 wherein the polepieces have overlapping portions bearing said narrow polar faces.

8. A magneto comprising a housing with sides and a partially closed top, polepieces in the sides of the housing, the closed portion of the top having an aperture through which the polepieces project, a distributor above the open portion of the top, a rotor in the housing, and an insulating plate over the open portion of the top between the rotor and the distributor.

9. A magneto having a distributor comprising a rotary member having brushes projecting from diametrically opposite portions of its circumference, the ends of said brushes in each of said portions lying in the same transverse plane.

10. A magneto having a distributor comprising a rotary member, having brushes projecting from diametrically opposite portions of its circumference, the ends of the brushes in one of said portions lying in one transverse plane, and the remaining brushes in a different transverse plane.

11. A magneto having polepieces with opposed polar projections, said polepieces also having overlapping portions with narrow polar projections, and rings uniting said polepieces.

12. The magneto according to claim 11, wherein the overlapping portions of the polepieces have facing laminæ on their opposite sides.

13. A magneto comprising a hollow body having a longitudinal chamber, polepieces lying in different transverse planes embedded in said body, each polepiece having polar faces exposed through the interior surface of said chamber, the polepieces projecting to the outside of the chamber, a generating coil bridging the projecting ends of said polepieces, and a rotor in the chamber, said rotor having magnets with like poles to cooperate simultaneously with the polar faces on each of said polepieces.

14. A magneto comprising a hollow body having a longitudinal chamber, polepieces lying in different transverse planes embedded in said body, each polepiece having polar faces exposed through the interior surface of said chamber, the polepieces projecting to the outside of the chamber, the projecting ends lying in one of said planes, a generating coil bridging the projecting ends of said polepieces, and a rotor in the chamber carrying magnets normal to the planes of the polepieces and with poles of like polarity to cooperate simultaneously with the polar faces on each of said polepieces.

15. A magneto having substantially parallel stator pole pieces, a core for a generating winding uniting said pole pieces at one end, and a rotor, one of said pole pieces lying substantially in a single plane tranverse to the axis of the rotor, the other pole piece being in effect bent laterally adjacent the end united to said core to off-set it from the first pole piece, the rotor carrying means providing a plurality of magnetic poles so arranged that poles of like polarity supply magnetic flux simultaneously to each of said pole pieces.

16. A magneto having substantially parallel stator pole pieces, a core for a generating winding uniting said pole pieces at one end, and a rotor, one of said pole pieces lying substantially in a single plane transverse to the axis of the rotor, the other pole piece being in effect bent laterally adjacent the end united to said core to off-set it from the first pole piece, each of said pole pieces being thicker adjacent said core than over their remaining portions, the rotor carrying means providing a plurality of magnetic poles so arranged that poles of like polarity supply magnetic flux simultaneously to each of said pole pieces.

17. A magneto having substantially parallel stator pole pieces, a core for a generating winding uniting said pole pieces at one end, and a rotor, one of said pole pieces lying substantially in a single plane transverse to the axis of the rotor, the other pole piece being in effect bent laterally adjacent the end united to said core to off-set it from the first pole piece, each pole piece having a polar projection adjacent said winding and another polar projection relatively remote from said winding to present polar faces to the rotor, the polar faces adjacent the winding being of relatively great area, the rotor carrying means providing a plurality of magnetic poles so arranged that poles of like polarity supply magnetic flux simultaneously to the polar faces of each pole piece.

18. A magneto having substantially parallel stator pole pieces, a core for a generating winding uniting said pole pieces at one end, and a rotor, one of said pole pieces lying substantially in a single plane transverse to the axis of the rotor, the other pole piece being in effect bent laterally adjacent the end united to said core to off-set it from the first pole piece, each pole piece having a polar projection adjacent the core and a polar projection more remote from said core to present polar faces to the rotor, the polar face of each pole piece adjacent the core being of greater width in the direction of said rotor axis, the rotor carrying means providing a plurality of magnetic poles so arranged that poles of like polarity supply magnetic flux simultaneously to the polar faces of each pole piece.

19. A magneto having an elongated curved pole piece comprising laminæ of great length, laminæ of less length adjacent one end, and relatively short laminæ interspersed among the laminæ of less length.

20. A magneto having an elongated curved pole piece comprising laminæ of great length, shorter laminæ at one end, said shorter laminæ being bent between their extremities, and relatively small laminæ between the shorter laminæ.

21. A magneto having an enlongated curved pole piece comprising laminæ of great length which are bent adjacent one end, and shorter laminæ attached thereto adjacent said end.

22. A magneto comprising a housing containing a rotor chamber, timer mechanism, a transversely mounted generating coil on said housing, a distributor mechanism on said housing beside said coil, a cover plate for one side of the mechanism and the adjacent end of the housing, and a cover secured to the top of said housing for said coil and the other side of the distributor mechanism.

23. A magneto comprising a housing containing a rotor, timer mechanism, a coil on the housing, distributor mechanism on the housing and covering one side thereof, a cover extending over said coil to the opposite side, said cover having a pocket on its inner surface and a condenser in said pocket and secured to said cover.

24. A magneto according to claim 23 wherein the condenser is connected to said coil, and said cover carries a grounding terminal.

25. A magneto comprising a housing including a rotor, timer mechanism, a coil on the housing, distributor mechanism on the housing, said distributor mechanism comprising a rotary member carrying a conductor united to said coil, a cover on the housing over said coil, a terminal for an external source of electric energy on said cover, a second conductor carried by said rotary member, and means comprising fixed and movable contacts uniting the second conductor to said terminal.

In testimony whereof I affix my signature.
WOLFGANG E. SCHWARZMAN.